United States Patent [19]

Decker et al.

[11] Patent Number: 5,218,857
[45] Date of Patent: Jun. 15, 1993

[54] EXHAUST-GAS ANALYZER

[75] Inventors: Hans-Josef Decker, Ronnenberg-Empelde; Horst Horn, Springe, both of Fed. Rep. of Germany

[73] Assignee: Siemens Aktiengesellschaft, Munich, Fed. Rep. of Germany

[21] Appl. No.: 699,746

[22] Filed: May 14, 1991

[30] Foreign Application Priority Data

May 14, 1990 [DE] Fed. Rep. of Germany ....... 4017472

[51] Int. Cl.$^5$ .............................................. G01N 1/22
[52] U.S. Cl. .................................................. 73/23.31
[58] Field of Search ......................................... 73/23.31

[56] References Cited

U.S. PATENT DOCUMENTS 3,603,155 9/1971 Morris et al. ................. 73/23.31 X
3,965,749 6/1976 Hadden et al. ....................... 73/23.31
4,586,367 5/1986 Lewis ............................. 73/23.31 X

FOREIGN PATENT DOCUMENTS 1280474 12/1986 U.S.S.R. .............................. 73/23.31

Primary Examiner—Hezron E. Williams
Assistant Examiner—Joseph W. Roskos
Attorney, Agent, or Firm—Kenyon & Kenyon

[57] ABSTRACT

An exhaust-gas analyzer, particularly for emissions testing of motor-vehicle engines has a sampling tube into which a mixture of exhaust gas and ambient air is fed through gas lines. A gas feed pump is disposed downstream of the sampling tube with a flowmeter inserted in the air line feeding electrical signals to a computing unit. The unit computes instantaneous standard total flow rate, allowing for gas pressure and temperature.

33 Claims, 1 Drawing Sheet

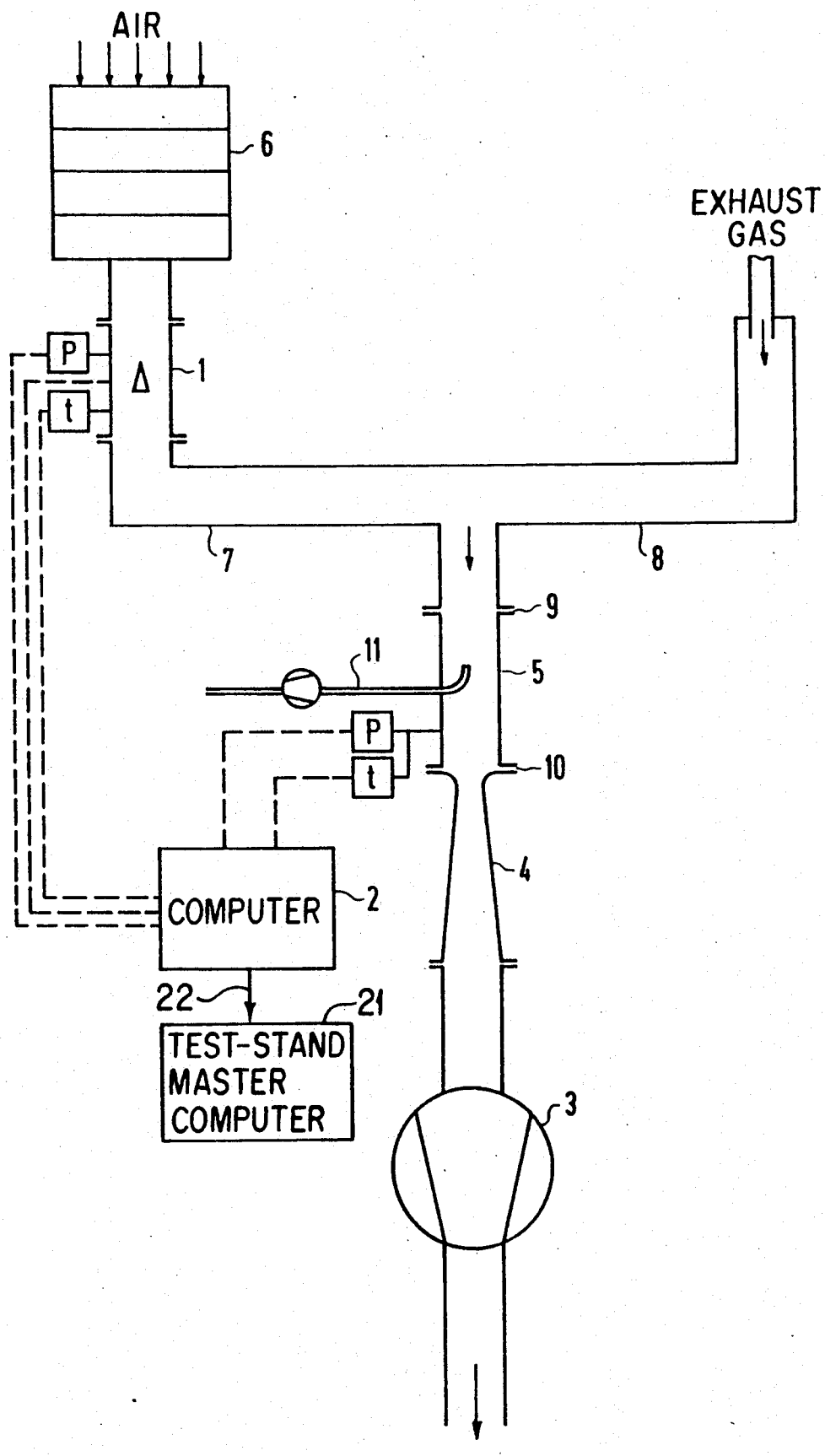

EXHAUST-GAS ANALYZER

BACKGROUND OF THE INVENTION

The present invention relates to an exhaust-gas analyzer, particularly for emissions testing of motor-vehicle engines. More specifically, the present invention is related to an analyzer having a sampling tube into which a mixture of exhaust gas and ambient air is fed through gas lines, a gas feed pump being disposed downstream of the sampling tube.

Many countries require the certification of motor vehicles, especially with respect to engine emissions. Many of the prescribed certification processes require a so-called CVS (constant-volume sampling) dilution system. In this CVS certification procedure, a sample is taken from a predetermined quantity of gas, composed of engine exhaust gas and ambient air. The ratio between exhaust gas and air changes continually because a driving cycle involves different operation modes such as acceleration, deceleration, etc., of the vehicle. Each mode results in different exhaust-gas/air ratios. In the known exhaust-gas analyzers for the CVS certification procedure, an average dilution rate has been used to determine the pollutant concentration. An average dilution rate will necessarily yield only an integrated value. An instantaneous result (in acceleration phases, for example) cannot be ascertained with such a procedure. Erroneous conclusions concerning the actual relationships therefore are not precluded.

SUMMARY OF THE INVENTION

The present invention substitutes direct evaluation for the integrated evaluation employed in the known exhaust-gas analysis. Thus, it is possible to measure the relationship between concentration and quantity of the exhaust gas unambiguously, during each operation mode, that is, in predetermined sampled portions. The present invention further seeks to achieve a simplified and lower-cost design of the exhaust-gas analyzer.

The present invention achieves these results by inserting a flowmeter into the air supply line. The flowmeter delivers electrical signals to a computing unit which computes the instantaneous standard total flow rate. The computing unit compensates for gas pressure and temperature in the gas mixture. This dispenses with the need for an expensive heat exchanger to maintain temperature equalization. Thus, there is no continuous energy consumption for cooling water or heat. A flowmeter in the air supply line, from whose values the standard flow rate is determined, allowing for gas pressure and temperature, provides a surprisingly simple and accurately operating CVS diluting system. For a mass flowmeter, the type of flowmeter used to great advantage, the condition of the air is unimportant. The air must merely be filtered to prevent fouling of the flowmeter based on the mass-flow principle.

The flowmeter is advantageously designed as a vortex-shedding flowmeter and operates on the Kármán vortex street principle. Vortices form at an impingement body with trapezoidal cross section and are alternately shed. The frequency f with which the vortices are shed is directly proportional to the fluid velocity, and hence proportional to the flow rate (volumetric flow rate Q). The measurement obtained is independent of pressure, temperature, density and viscosity of the measured medium, provided that a critical Reynolds number Re is observed. Such vortex flowmeters are known and are mass-produced. Surprisingly, their use yields synergistic advantages with respect to the makeup of the entire exhaust-gas analyzer.

BRIEF DESCRIPTION OF THE DRAWING FIGURE

FIG. 1 illustrates a diluting and sampling system in accordance with a first embodiment of the present invention.

DETAILED DESCRIPTION

In FIG. 1, the analyzer includes a flowmeter, such as a vortex-breaking flowmeter. The pressure and temperature prevailing in it are continuously measured and electronically compensated. This may be done in the manner shown or in a decentralized manner.

The air measured in the flowmeter 1 is first filtered by means of an air filter 6. The latter may be a cartridge filter or a bag filter. The exhaust gases from the internal-combustion engine being tested arriving through line 8 are combined with the air flowing through the line 7. A pipe 11 withdraws a desired sample portion from a stabilizing section 5. The stabilizing portion 5, at which measuring instruments P and T measure pressure and temperature, is advantageously disposed between flanges 9 and 10. On the inlet side, it may be provided with equalizing elements (not shown), for example, a baffle grid, for the two partial streams of exhaust gas and air brought together. Both the measured value from the flowmeter 1 and the pressure and temperature values are fed to a computing unit 2, which may be a Siemens 16-bit SMP computer, for example, the computing unit determines the instantaneous standard total flow rate and sends that information to the test-stand master computer 21 via bus 22.

The stabilizing length or steady flow zone 5, sampled through the pipe 11, is followed by a venturi nozzle 4. That nozzle is a critical nozzle and allows only a constant, maximum flow rate. A gas feed pump 3 is downstream of the nozzle 4. The rated suction capacity of the pump 3 is greater than the maximum mass rate of flow through the exhaust-gas analyzer. This assures constant flow through the exhaust-gas analyzer. Pulsations in the exhaust-gas flow are advantageously dampened, and an accurate instantaneous value can be determined in standard quantities. Because of the smooth flow through the dilution system and the elimination of the heat exchanger with its flow-stabilizing properties, this behavior of the suction side of the dilution system is of particular importance.

While the individual components of this analyzer are known per se, one skilled in the art could not have expected the combination arrangement in accordance with the invention, as shown in the drawing, to be serviceable in the absence of invention since its basic design differs in principle from the prior-art CVS analyzers.

What is claimed is:

1. An exhaust-gas analyzer such as for emissions testing of motor-vehicle engines comprises:
   a sampling tube into which a mixture of exhaust gas and ambient air is fed through gas lines;
   a gas feed pump disposed downstream of said sampling tube;
   a flowmeter disposed in an air line upstream of said gas feed pump and producing electrical signals; and a computing unit, which computes the instantaneous standard total flow rate using said electrical signals, while allowing for gas pressure and gas temperature.

2. The analyzer of claim 1, wherein said computing unit comprises a correction program for the precedence of flow-rate measurement over sampling.

3. The analyzer of claim 2, wherein said gas feed pump comprises a pump with constant suction capacity, and further comprises a nozzle upstream of said pump and designed as a "critical" nozzle.

4. The analyzer of claim 3, wherein said gas feed pump comprises a displacement pump.

5. The analyzer of claim 2, wherein an sample is taken from a steady-flow zone, in which the pressure and the temperature of gas are measured.

6. The analyzer of claim 2, wherein said flowmeter for the air comprises a mass flowmeter.

7. The analyzer of claim 2, wherein in said computing unit is connected to a test-stand master computer, said computing unit feeding input data for computation of the test results to said test-stand master computer.

8. The analyzer of claim 1, wherein said gas feed pump comprises a pump with constant suction capacity, and further comprises a nozzle upstream of said pump and designed as a "critical" nozzle.

9. The analyzer of claim 8 wherein said gas feed pump comprises a displacement pump.

10. The analyzer of claim 8, wherein an sample is taken from a steady-flow zone, in which the pressure and the temperature of gas are measured.

11. The analyzer of claim 1, wherein a sample is taken from a steady-flow zone, in which the pressure and the temperature of gas are measured.

12. The analyzer of claim 1, wherein said flowmeter for the air comprises a mass flowmeter.

13. The analyzer of claim 12 wherein said mass flow meter comprises a vortex flowmeter.

14. The analyzer of claim 12, wherein in said computing unit is connected to a test-stand master computer, said computing unit feeding input data for computation of the test results to said test-stand master computer.

15. The analyzer of claim 12, wherein said mass flow-meter comprises a flowmeter based on the principle of vortex tails, for measuring the air added to the exhaust gases.

16. The analyzer of claim 15, wherein said computing unit determines the instantaneous standard exhaust-gas flow rate, allowing for the precedence of the mass flow measurement from the values of the mass flowmeter, in conjunction with the pressure and temperature of the gas mixture at a constant total flow rate.

17. The analyzer of claim 1, wherein in said computing unit is connected to a test-stand master computer, said computing unit feeding input data for computation of the test results to said test-stand master computer.

18. An exhaust-gas analyzer comprising:
an air intake line having an inlet and an outlet;
an exhaust gas intake line having an inlet and an outlet;
a flowmeter, said flowmeter being disposed between said inlet and said outlet of said air intake line;
a stabilizing section, said stabilizing section having a first end and a second end, said first end of said stabilizing section being connected to said outlet of said air intake line and to said outlet of said exhaust gas intake line;
a gas feed pump, said gas feed pump being connected to said second end of said stabilizing section;
means for withdrawing a sample, said means for withdrawing a sample being disposed between said first end and said second end of said stabilizing section;
a computer; and
a gas temperature and pressure sensor, said gas temperature and pressure sensor being disposed in said stabilizing section and providing signals to said computer.

19. The exhaust gas analyzer of claim 18 wherein said stabilizing section includes two flanges and wherein said means for withdrawing a sample comprises a pipe disposed between said two flanges.

20. The exhaust gas analyzer of claim 19 further comprising a venturi nozzle disposed in said stabilizing section between said means for measuring and said second end of said stabilizing section.

21. The exhaust gas analyzer of claim 18 further comprising a venturi nozzle disposed in said stabilizing section between said means for measuring and said second end of said stabilizing section.

22. The exhaust gas analyzer of claim 21 wherein said stabilizing section has a maximum mass rate of flow and said gas feed pump has a rated section capacity greater than said maximum mass rate of flow.

23. The exhaust gas analyzer of claim 22 wherein said gas feed pump comprises a displacement pump.

24. The exhaust gas analyzer of claim 21 wherein said flow meter comprises a mass flowmeter.

25. The exhaust gas analyzer of claim 21 wherein said flow meter comprises a vortex flowmeter.

26. The exhaust gas analyzer of claim 18 wherein said stabilizing section has a maximum mass rate of flow and said gas feed pump has a rated section capacity greater than said maximum mass rate of flow.

27. The exhaust gas analyzer of claim 26 wherein said gas feed pump comprises a displacement pump.

28. The exhaust gas analyzer of claim 27 wherein said flow meter comprises a mass flowmeter.

29. The exhaust gas analyzer of claim 27 wherein said flow meter comprises a vortex flowmeter.

30. The exhaust gas analyzer of claim 26 wherein said flow meter comprises a mass flowmeter.

31. The exhaust gas analyzer of claim 26 wherein said flow meter comprises a vortex flowmeter.

32. The exhaust gas analyzer of claim 18 wherein said flow meter comprises a mass flowmeter.

33. The exhaust gas analyzer of claim 18 wherein said flow meter comprises a vortex flowmeter.

* * * * *